L. & Z. HALL & W. CROWELL.
Cranberry-Picker.
No. 199,703. Patented Jan. 29, 1878.
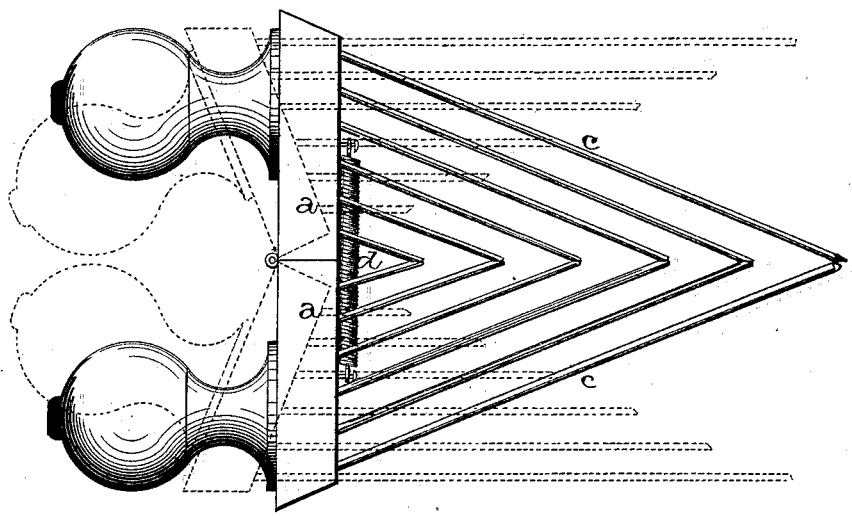
WITNESSES
INVENTORS.

UNITED STATES PATENT OFFICE.

LUTHER HALL, ZEBINA HALL, AND WILLIAM CROWELL, OF DENNIS, MASS.

IMPROVEMENT IN CRANBERRY-PICKERS.

Specification forming part of Letters Patent No. 199,703, dated January 29, 1878; application filed September 24, 1877.

*To all whom it may concern:*

Be it known that we, LUTHER HALL, ZEBINA HALL, and WILLIAM CROWELL, of Dennis, in the county of Barnstable and State of Massachusetts, have invented certain new and useful Improvements in Cranberry-Pickers; and we do hereby declare the following to be a full, clear, and exact description of the invention, such as will enable others skilled in the art to which it pertains to make and use it, reference being had to the accompanying drawing, which forms part of this specification.

Our invention relates to an improvement in cranberry-pickers; and it consists in a hinged back, provided with two or more springs for closing it, each back being provided with a handle on its rear side for operating it, and on its front side with inclined wires for pulling the berries from the vines, as will be more fully described hereinafter.

The accompanying drawing represents our invention.

$a$ represents a board, made in two pieces, and hinged together at its center, so as to open and close. Each half is provided on its rear side with a knob or handle, for the purpose of opening and closing the two parts, and for carrying the picker about. Upon the front side of each part are the inclined wires $c$, which form a V-shaped cage, closed on both the sides and the ends, for the purpose of pulling the berries from the vines, and holding them as long as it may be necessary before emptying them into the basket or other receptacle. Inside of the cage are placed one, two, or more springs, $d$, of any desired construction, for closing the two halves of the cage together, and these springs should be of sufficient strength to prevent the cage from opening too readily.

The operation of our picker is as follows: The operator opens the two jaws sufficiently far apart, and then inserts them under and over the vines, and then draws the picker back toward him, instead of raising it upward. As the side wires do not quite meet at their ends, a sufficient space is left for the vines to pull readily out again in case they should be inclosed in the cage. The wires are made of fine steel or other substance, and have sufficient strength to prevent the berries from slipping through with vines as the picker is pulled backward. After the berries have once been caught in the cage, they will be held until the jaws are opened to discharge them into a basket or other receptacle.

Heretofore the great failure with cranberry-pickers was the attempt to raise or pull them upward through the vines, whereby they became so entangled in the vines as to be inoperative for the purpose for which they were designed.

By inserting our picker in under the vines and then drawing it back toward the operator we entirely overcome this difficulty, at the same time that we clean the berries from the vines much more successfully.

The points or front ends of the wires or teeth on the upper jaw are to be pointed or flattened.

Having thus described our invention, we claim—

The combination of the two boards $a$, hinged together and provided with the wires $c$ and handles, with the springs $d$ for closing them, substantially as shown and described.

In testimony that we claim the foregoing we have hereunto set our hands this 15th day of September, 1877.

LUTHER HALL.
ZEBINA HALL.
WILLIAM CROWELL.

Witnesses:
 E. CLARENCE MATTHEWS,
 SETH TOBEY.